United States Patent [19]
Chuang et al.

[11] Patent Number: 5,889,500
[45] Date of Patent: Mar. 30, 1999

[54] SINGLE CHIP DISPLAY SYSTEM PROCESSOR FOR CRT BASED DISPLAY SYSTEMS

[75] Inventors: Charles Chuang; Warren Chen; Anthony Yeh, all of Taipei, Taiwan

[73] Assignee: Dynacolor Inc., Taipei, Taiwan

[21] Appl. No.: 791,571

[22] Filed: Jan. 31, 1997

[51] Int. Cl.⁶ .................................................. G09G 1/06
[52] U.S. Cl. ............................................. 345/10; 345/213
[58] Field of Search .................................. 345/204, 205, 345/206, 211, 212, 213, 10, 11, 12, 13, 14, 20; 348/725

[56] References Cited

U.S. PATENT DOCUMENTS

| | | | |
|---|---|---|---|
| 4,383,273 | 5/1983 | Lunn | 348/725 |
| 5,031,118 | 7/1991 | Morizot | 345/213 |
| 5,610,663 | 3/1997 | Nan et al. | 345/213 |
| 5,654,743 | 8/1997 | Hu et al. | 345/213 |
| 5,670,972 | 9/1997 | Kim | 345/13 |

*Primary Examiner*—Xiao Wu
*Attorney, Agent, or Firm*—Sughrue, Mion, Zinn, Macpeak & Seas, PLLC

[57] ABSTRACT

A single chip display system processor in a CRT (Cathode Ray Tube) based display is disclosed, including a display system controller, a horizontal processor, a vertical processor, and optionally, the on screen display (OSD) processor. The horizontal processor, a vertical processor, and the on screen display (OSD) processor are under control by the display system controller. This single chip display system processor also controls some elements of the CRT based display, such as power horizontal deflection circuit, power vertical deflection circuit, video processor, the power video circuit, power supply for the electronics and CRT, and the user front panel. The display system processor encompasses a phase lock loop (PLL) circuit within the horizontal processor that compares incoming horizontal signal with the feedback signal from power horizontal deflection circuit for the purpose of synchronizing incoming video signals to display stable image in the CRT based display system.

24 Claims, 9 Drawing Sheets

SINGLE CHIP DISPLAY SYSTEM PROCESSOR FOR CRT BASED DISPLAY SYSTEMS

BACKGROUND OF THE INVENTION

1. Field of the Invention

The present invention relates to a CRT (Cathode Ray Tube) based display system and more particularly to a CRT based display system with a display system processor integrated in a single chip. Inclusion of analog functions in this IC (Integrated Circuit) significantly lower system cost and enhance display capability.

2. Description of the Prior Art

In present day design, Cathode Ray Tube (CRT) based display systems are controlled primarily by analog circuit. Horizontal deflection control circuit and vertical deflection control circuit are constructed via analog components or analog integrated circuit. On the other hand, digital display system controller is used for managing all aspect of the display attributes and control of deflection circuit for digital controlled monitor. The digital display system controller typically consists of a microprocessor, associated memory, and control software that is processed via a conventional low cost digital semiconductor processor. This controller typically interfaces with deflection analog circuit via two methods. The first method is to provide an analog interface to the deflection analog circuit. The second method is to provide a digital interface to the digital section of such analog circuit. Thereof, deflection related parameters such as horizontal size, horizontal centering, vertical size and vertical centering can be changed.

For on screen display (OSD) application, a separate integrated circuit controller is used to generate the necessary video information. Digital display system controller must communicate video content and video position information to the OSD chip.

Figure 1:
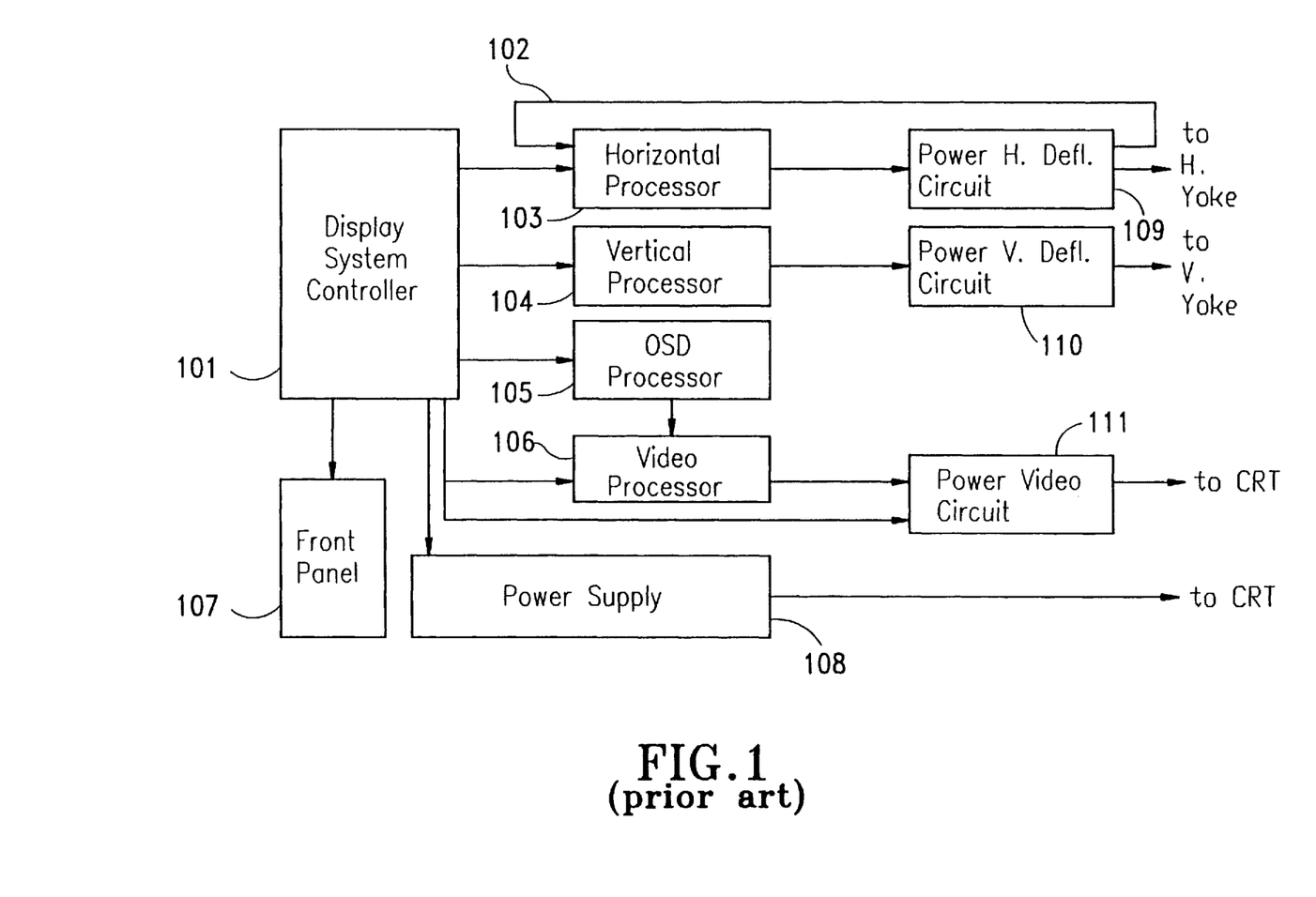
FIG. 1 shows a block diagram for display control system of conventional design.

FIG. 1 shows a block diagram of conventional display control system. A digital display system controller 101 controls display front panel 107, power supply 108, video processor 106, power video circuit 111, on screen display (OSD) processor 105, vertical processor 104, and horizontal processor 103. Each block mentioned above consists of individual electric circuit. Power horizontal deflection circuit 109 controls horizontal deflection through horizontal yoke (H. yoke), and generates a flyback pulse 102 to the horizontal processor 103. Power vertical deflection circuit 110 couples with the vertical processor 104 and controls vertical deflection through vertical yoke (V. yoke).

Current technology requires individual integrated circuit (IC) for deflection control, on screen display (OSD) generation, and digital display system controller. Due to different process technology used in these ICs, there is no single IC that integrates digital display system controller with deflection control, and no single IC that integrates digital display system controller with an OSD processor.

SUMMARY OF THE INVENTION

The principal object of the present invention is to provide a CRT based display system with a highly integrated, single chip display system processor that consumes low power and reduces system cost.

The other object of the invention is to construct the display system processor with phase lock loop for deflection control. Display phase adjustment, and size adjustment and linearity adjustment all can be done in this chip.

A further object of the invention is to provide a synchronized timing reference that can be used as the video clock for on screen display generation and video blanking controls.

This single chip encompasses a display system controller that controls a horizontal processor, a vertical processor, and optionally, an on screen display (OSD) processor. The horizontal processor further includes a phase lock loop section for controlling horizontal deflection and generating the synchronized timing reference. The vertical processor is composed of counter dividers, pulse width modulation generators, low pass filter, and integrators for controlling vertical deflection and generating a vertical ramp. The synchronized timing reference is also used to modulate the size of on screen display based on various applications.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 2:
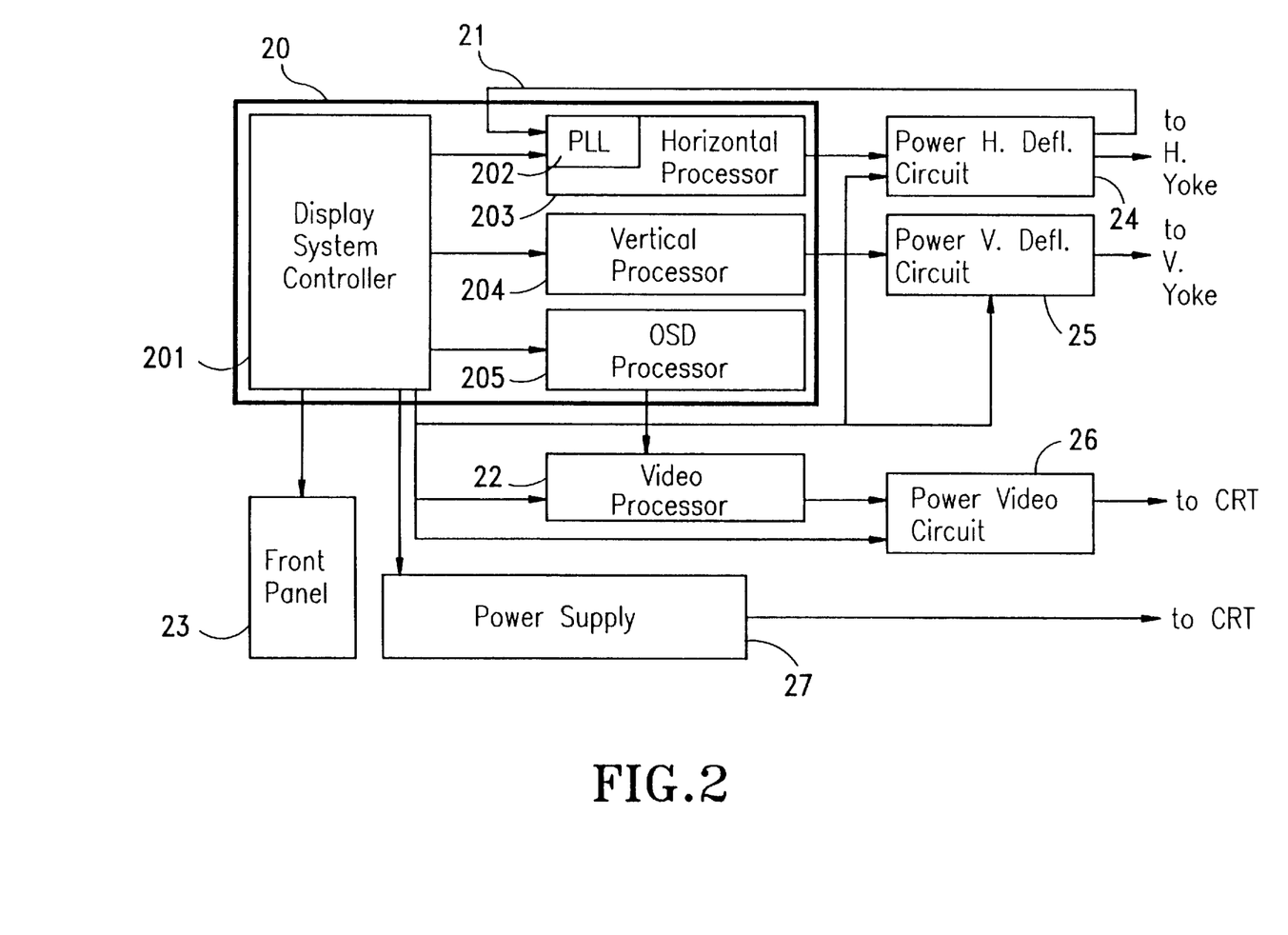
FIG. 2 illustrates a block diagram for a CRT based display system incorporating an integrated circuit having a display system processor according to the present invention.

FIG. 2 illustrates the block diagram of a CRT based display system that encompasses a single chip of display system processor 20 for controlling operations of display front panel 23, powers supply 27, video processor 22, power video circuit 26. Each block mentioned above consists of individual electric circuit. Power horizontal deflection circuit 24 controls horizontal deflection through horizontal yoke (H. yoke), and generates a pulse flyback 21 to the display system processor 20. Power vertical deflection circuit 25 is coupled and controlled by the display system processor 20 for vertical deflection through vertical yoke (V. yoke).

The display system processor 20 combines several function blocks in a single chip. These functions are: a digital system controller 201, a horizontal processor 203, a vertical processor 204, and an on screen display (OSD) processor 205. The digital display system controller 201 further contains a microprocessor, registers, counters, random access memory (RAM), and is used to generate control signals for controlling operations of the CRT based display system. For example, the display system controller 201 contains an interface port connecting with the display user front panel 23 for accepting input from a user, an interface port to the power supply 27 for power management functions, an interface port to the video processor 22 for contrast and color temperature control, and an interface port to the power video circuit 26 for brightness display control. The power horizontal deflection circuit 24 and power vertical deflection circuit 25 are also controlled by the display system controller 201 for size controls and in some designs, linearity controls.

Characterized in the horizontal processor 203 further encompasses a PLL (Phase Lock Loop) section 202 that compares an incoming horizontal signal with the feedback signal 21 from the power horizontal deflection circuit 24 for the purpose of displaying stable image on the screen of the CRT based display system.

Figure 3A:
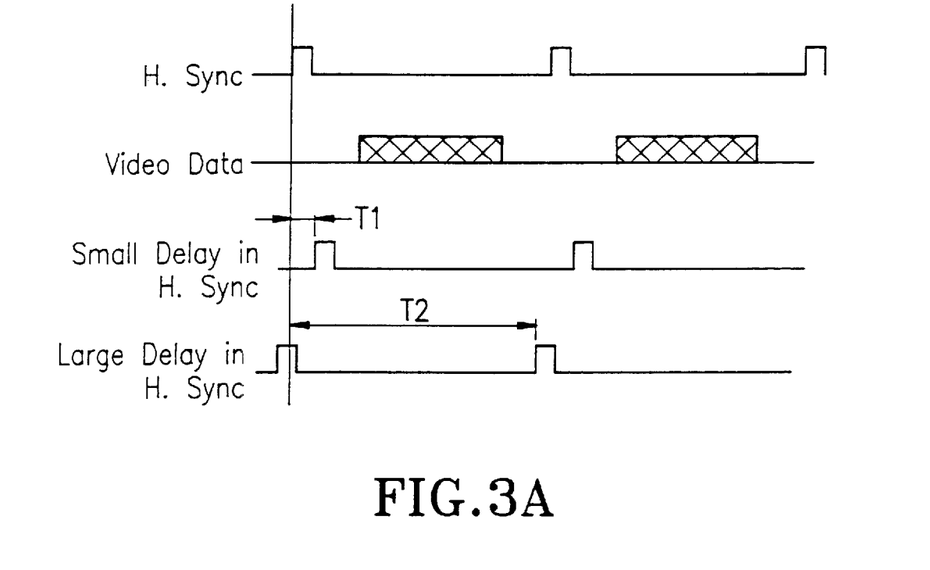
FIG. 3A is a timing waveform for describing a relationship when there is a delay in the horizontal synchronizing signal with the video data.
Figure 3B:
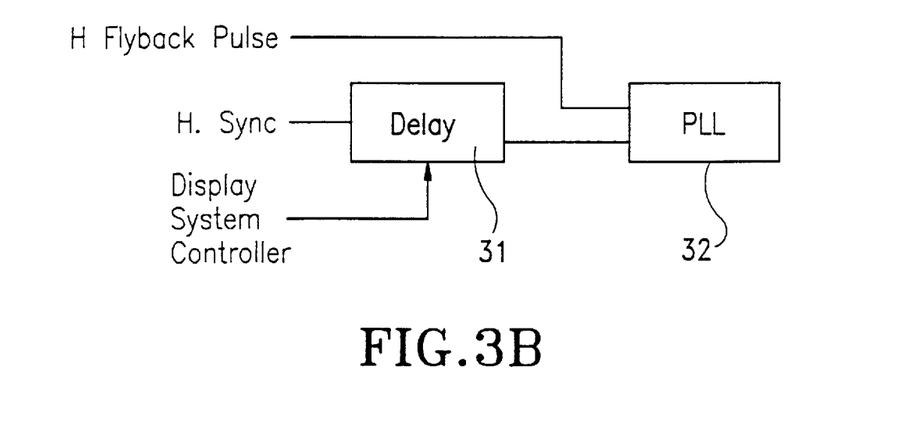
FIG. 3B shows a delay circuit for changing video data horizontal position.

FIG. 3A shows a timing relationship between horizontal synchronization signal (HSync) and the video signal. A small delay (T1 in FIG. 3A) of HSync signal will cause the display image shifting to the left of the CRT screen. A large delay (T2 in FIG. 3A) will cause the display image shifting to the right of the CRT screen. FIG. 3B shows a delay circuit for changing the horizontal video position. This circuit feeds the output of a digital delay line circuit 31 into a PLL circuit 32. The display system processor 20 can program the delay time in the digital delay line circuit 31 and change the horizontal position of the display image.

Figure 5:
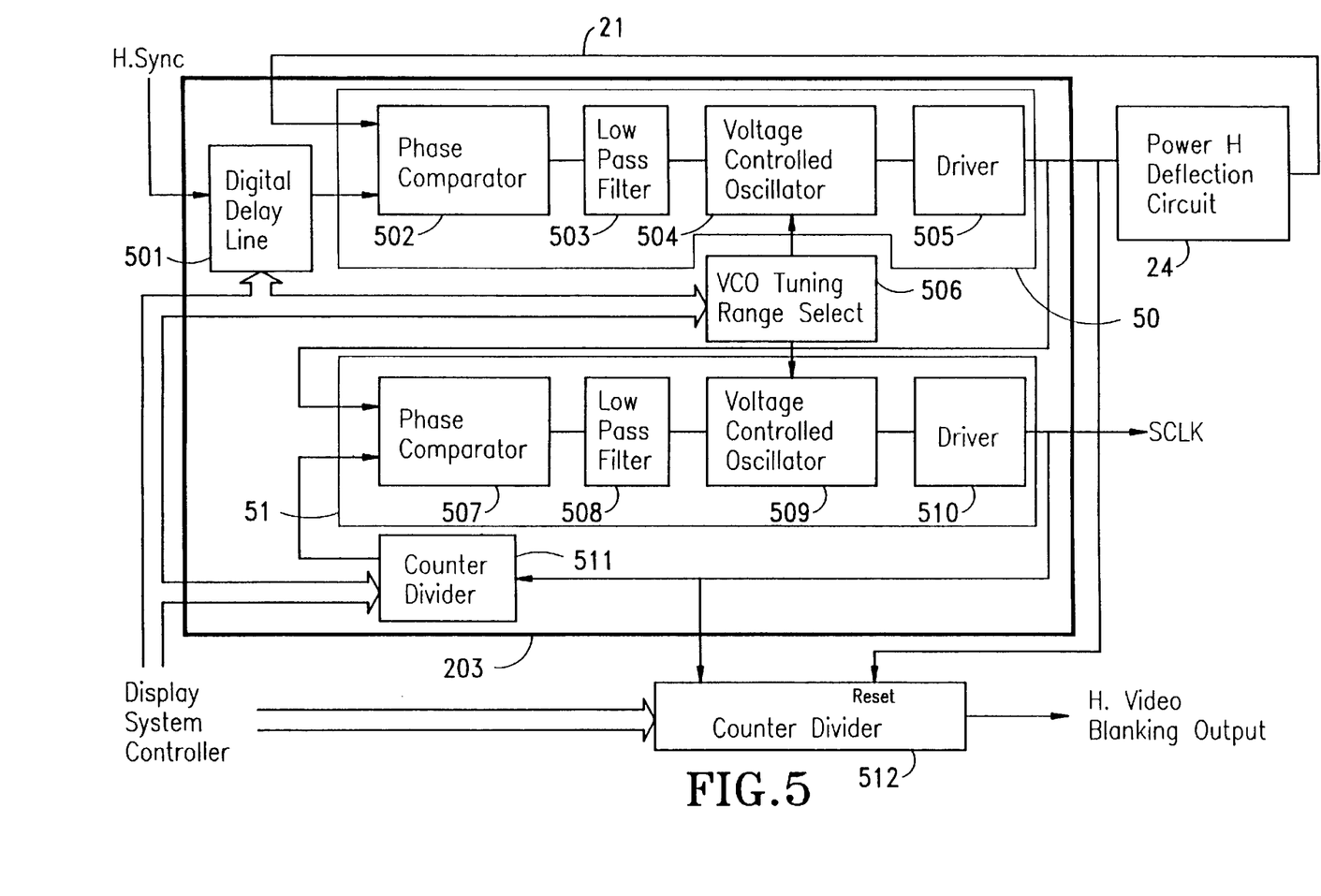
FIG. 5 is a block diagram of a horizontal processor according to the present invention.

A detail block diagram of the horizontal processor 203 is shown in FIG. 5. The horizontal processor 203 consists of a digital delay line 501 for horizontal phase control, PLL sections 50 and 51, a circuit of VCO (Voltage Controlled Oscillator) tuning range select 506, and a counter divider 511.

The PLL section 50 encompasses a phase comparator 502 that compares the HSync with the horizontal flyback pulse 21, and generates a difference signal that feed to a low pass filter 503 before connecting to a voltage controlled oscillator (VCO) 504. Output of the VCO 504 is phase locked and amplified by the driver 505. The output of the PLL 50 section is then fed to the power horizontal deflection circuit 24 for further amplification, and generates a ramp signal suitable for driving the horizontal deflection yoke.

The output of the PLL circuit 50 is also used in PLL circuit 51 that consists of phase comparator 507, low pass filter 508, VCO 509, and a driver 510. A counter divider 511 divides down the VCO 509 frequency (a high frequency clock $S_{CLK}$) before sending it to the phase comparator 507. Since output of the counter divider 511 is synchronized with HSync, the output of the VCO 509 is also synchronized with the horizontal circuit, and its frequency is exact multiple of horizontal circuit set by the counter divider 511. For example, if the counter divider 511 is set to 1024, then the $S_{CLK}$ will be 1024 times the HSync. As another example, if the counter divider 511 is set to 512, then the $S_{CLK}$ will be 512 times the HSync. This high frequency clock $S_{CLK}$ can be further used as a pixel clock for video application.

Figure 10:
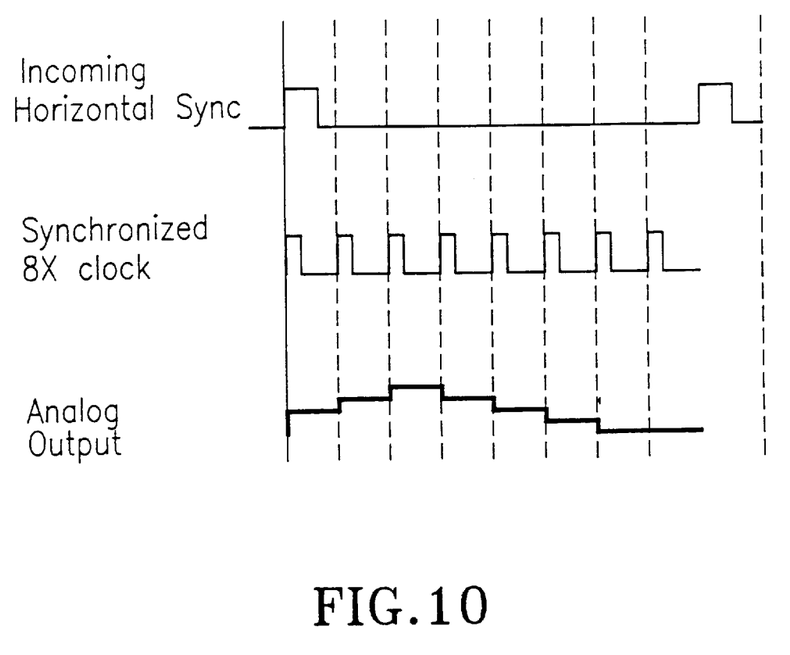
FIG. 10 represents a timing diagram for segregating the CRT based display from left side to right side of the CRT based display by using eight equal time segments.

Using the synchronization high speed clock $S_{CLK}$, a divider circuit can produce a clock that is many times the horizontal rate. In FIG. 10 there are eight clocks for each horizontal period. These eight clocks then segregates the CRT based display into eight equal time segments from left side of CRT based display to right side of CRT based display. This clock can then be used to gate an analog output that is either produced via a PWM (Pulse Width Modulation) method on chip or analog means off chip. This waveform, or a low passed filtered version can be used as correction waveform for geometry, colorimetry, convergence, or purity attributes in the horizontal direction of the CRT based display. For example, horizontal linearity correction can be achieved using this waveform, eliminating costly analog wave shaping circuit.

Video blanking signal is desirable during the beam retrace time for better performance. The horizontal video blanking signal can be produced by running the high frequency clock $S_{CLK}$ into the counter divider 512 and reset by the output of driver 505 in the circuit of FIG. 5. Blanking pulse width can be programmed by the display system controller 201.

The circuit of VCO tuning range select 506 ("VCO tuning circuit" as for short) is used to extend the PLL range to cover the wide horizontal frequency. The VCO tuning is controlled by the display system controller 201. Usually, locking range of a PLL circuit is limited to a small range centered around the tuning frequency of the voltage controlled oscillator (VCO), it is necessary to extend the tuning frequency.

Figure 4A:
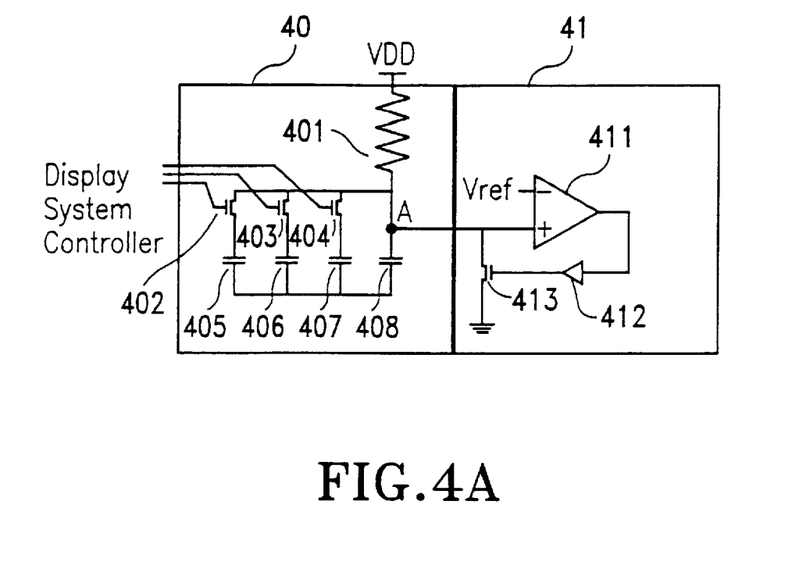
FIG. 4A describes a tuning circuit for voltage controlled oscillators.

Detail circuit diagram of the VCO tuning circuit 506 is represented in FIG. 4A. The VCO tuning circuit 506 in the FIG. 4A encompasses a PLL oscillator circuit 41 which is constructed of a comparator 411, a buffer 412, a MOS (Metal-Oxide-Semiconductor) transistor 413, and a tuning RC network 40 which is composed of resistor 401, MOS transistors 402, 403, 404 as switches, and capacitors 405, 406, 407, and, 408.

The resister 401 will pull positive input of the comparator 411 to be high over a time constant determined by the RC time constant. As the comparator 411 input move above the voltage reference $V_{ref}$, the output terminal of the comparator 411 will be pulled to high, causing the buffer 412 to pull high and discharge the positive input of the comparator 411 via a MOS transistor 413. As the positive input drops below $V_{ref}$, the output terminal of the comparator 411 drops down and the MOS transistor 413 switches off, and allows the RC tuning network 40 to start rising again. The cycle then repeats and generates a sawtooth waveform as the curve II in FIG. 4B.

Figure 4B:
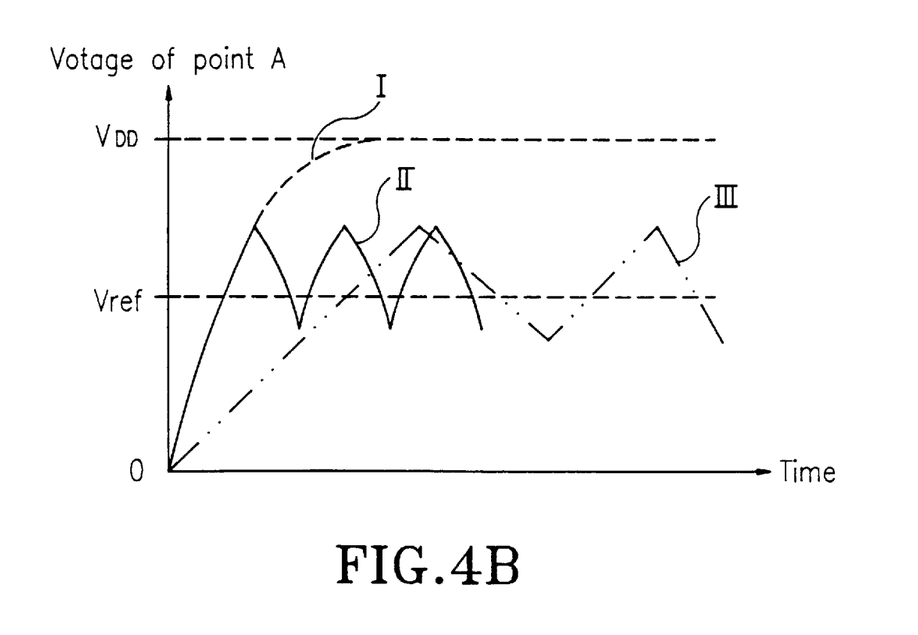
FIG. 4B illustrates waveform diagram describing frequency variations when different capacitor are applied in the FIG. 4A.

The FIG. 4B displays several curves based on different tuning frequencies. Curve I shows a simple RC changing waveform with only resistor 401 and capacitor 408. When the PLL oscillator circuit 41 is connected, a waveform represented by the curve II will be generated as explained. Similarly, a waveform represented by curve III will be generated by turning on the MOS transistors 402, 403, and 404 to be on for activating the capacitors of 405, 406, 407, and 408 in the same time. Via switches made by the MOS transistor 402, 403, and 404, capacitors 405, 406, 407, 408 of different values can be connected to the resistor 401 and changed the center tuning frequency of the voltage controlled oscillator. This is a method to extend the operating range of the PLL to accommodate wide horizontal and vertical frequency range expected of a multiple synchronization CRT based display.

Figure 6:
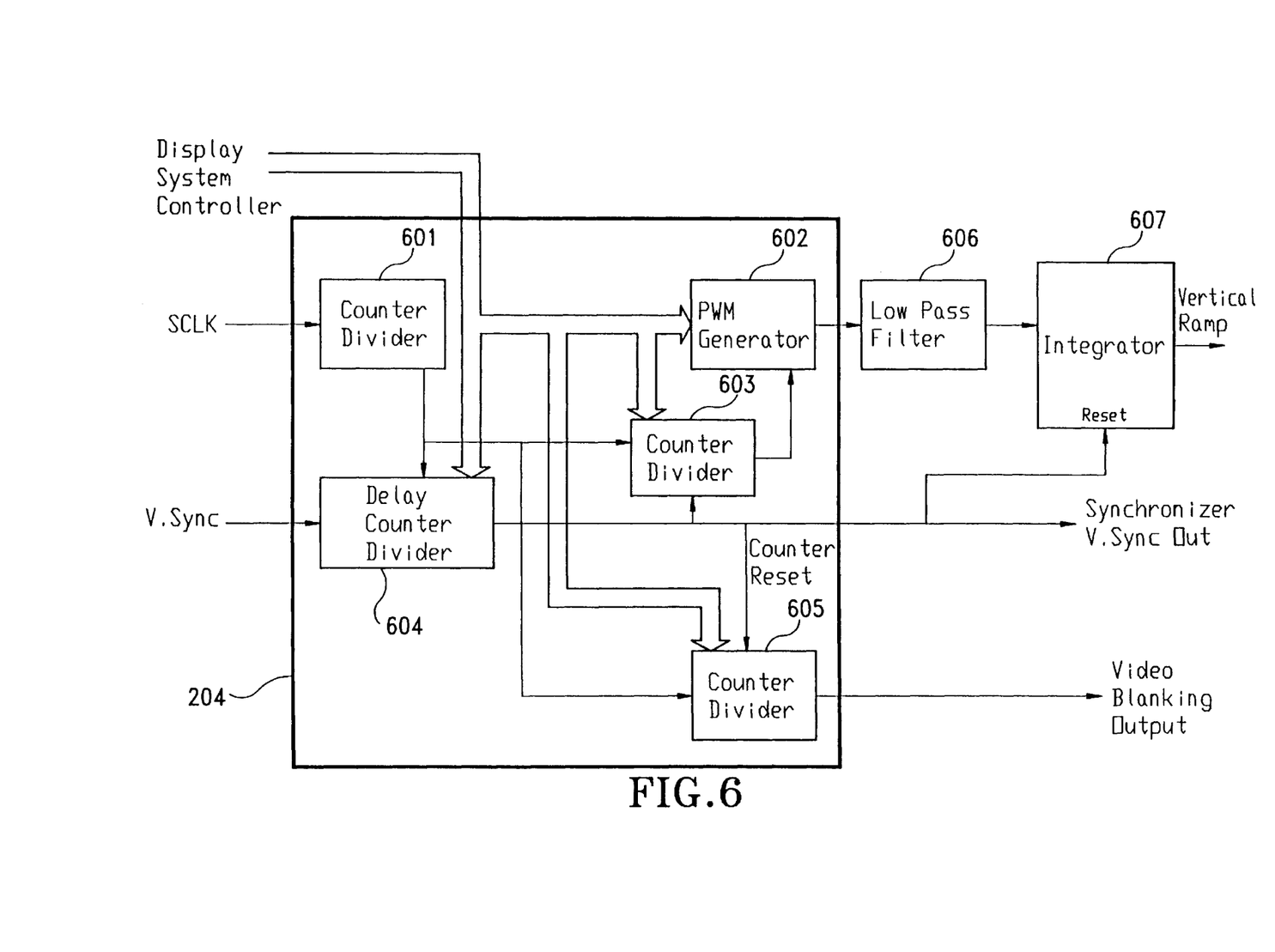
FIG. 6 displays a block diagram of a vertical processor according to the present invention.

FIG. 6 is a detail block diagram of the vertical processor 204. The vertical processor 204 consists of counter divider 601, 603, and 605, a delay counter divider 604, and a PWM (Pulse Width Modulation) generator 602. The counter divider 601 divides down the high frequency clock $S_{CLK}$ to a clock that is double in frequency as the HSync. This signal is used as a synchronization clock for the counter divider 603 and 605, and the delay counter divider 604. Two times (or higher) horizontal clock is essential for VSync synchronization because VSync signal for interlaced display occurs at half horizontal time. Vertical delay circuit is similar to horizontal delay circuit as shown in FIG. 3B.

The Vsync is used as a reset pulse to counter divider 603 that controls the pulse width modulation (PWM) generator 602 described below. Output of the PWM generator 602 is filtered by a low pass filter 606 into an analog voltage before feeding to an integrator 607 that produces a ramp signal used by the power vertical deflection circuit 25. The VSync also resets the counter divider 605 to generate the video blanking signal whose width is controlled by the display system controller 201.

The VSync is also applied to reset the external integrator 607 for terminating the vertical ramp signal for ensuring that right after vertical retrace, the vertical ramp always start at the same voltage. The display system controller 201 accesses to all the counter divider 601, 603,604, and 605 to change their values. The display system controller 201 also accesses to the PWM generator 602 in order to change the pulse width modulation value. The counter divider 603 is programmed by the display system controller 201 for generating a programmable time delay pulse used in linearity adjustment.

Figure 7:
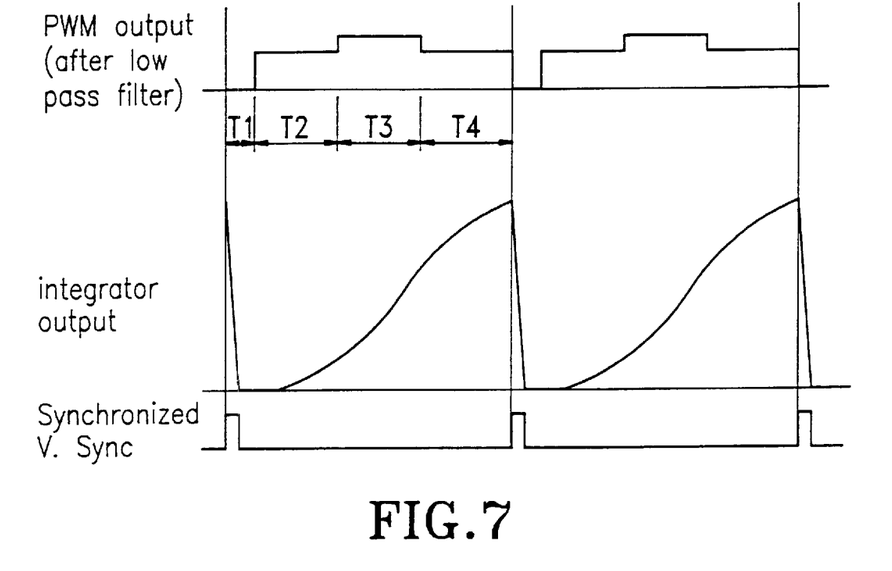
FIG. 7 is a waveform diagram for showing pulse width modulation outputting by vertical ramp generation circuit.

FIG. 7 shows a vertical ramp from output terminal of the integrator 607. The VSync is used to reset the output integrator 607, that will discharge the output of the integrator to a low level after some time period. At preprogrammed time delay T1, the display system controller 201 loads a PWM value to the PWM generator 602, and the output integrator 607 exhibits the integrating waveform. At preprogrammed time delay T2, the display system controller 201 loads a different PWM value to the PWM generator 602, and the output of integrator 607 exhibits a change in the integrating waveform. By changing the vertical ramp slope, vertical sweep rate or the vertical linearity is changed. Furthermore, the display system controller 201 can adjust the vertical linearity via time delay setting and PWM generation till the specification is met.

Figure 8:
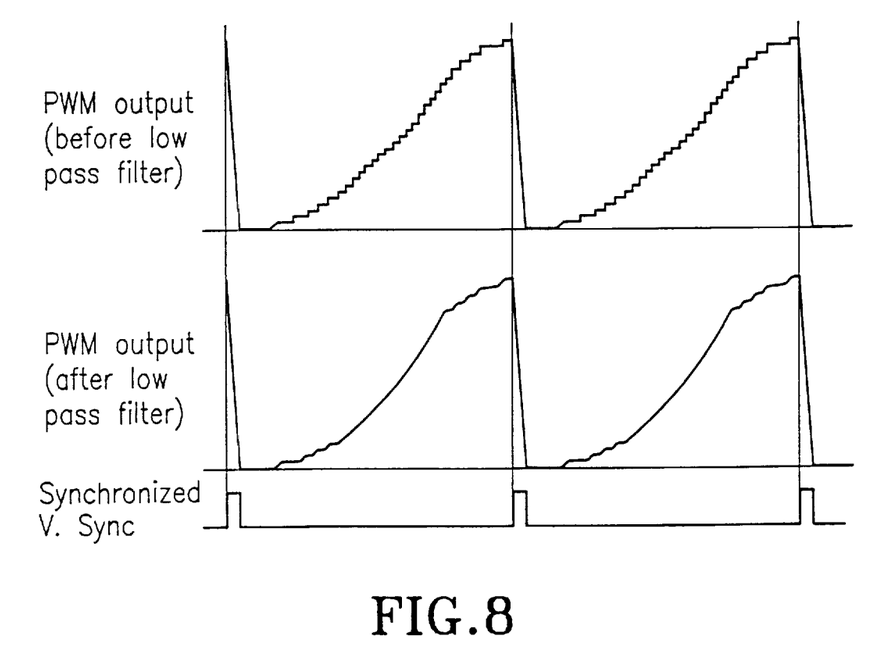
FIG. 8 describes an output waveform of the vertical ramp when no integrator is applied.

FIG. 8 shows an output waveform of the vertical ramp circuit when no integrator is applied. The jagged waveform is a direct result of digital to analog conversion where there is a minimum step representing the smallest change in digital value. Even after low pass filtering where high frequency jagged waveform are smoothed out, low frequency waveform still exhibit the jagged steps. Attempt to use a low pass filter that smooth out the low frequency signal will result in severe distortion of high frequency waveform. A digital domain solution is to increase the resolution of the digital representation in order to reduce the size of the minimum step. This solution, however, leads to a much larger digital to analog converters (DACs) and a much larger memory needed to store the waveform information. These two combination leads to a higher cost IC. By employing the integrator 607 at the output of the digital to analog conversion as shown in FIG. 6, very smooth waveform can be obtained with low resolution DACs and small memory requirement for waveform storage. Ramp generation output from the integrator 607 leads to a much lower cost IC.

The circuit that generates the vertical ramp, as shown in FIG. 6, can be used to generated any waveform with periodicity that is the same as horizontal frequency or multiples of the horizontal frequency. A parabola correction waveform can be generated for display pincushion correction. Hardware function block is identical to vertical deflection processor. The only difference is for the display system controller 201 to download the pincushion correction values into the PWM generator 602, and different time lapse information into the counter divider 603. Output of this circuit is connected to the horizontal size circuit for pincushion correction. Via the same circuit, focus parabola correction waveform for uniform focus, brightness parabola correction waveform for brightness uniformity, and other CRT attribute corrections can be generated easily.

Figure 9:
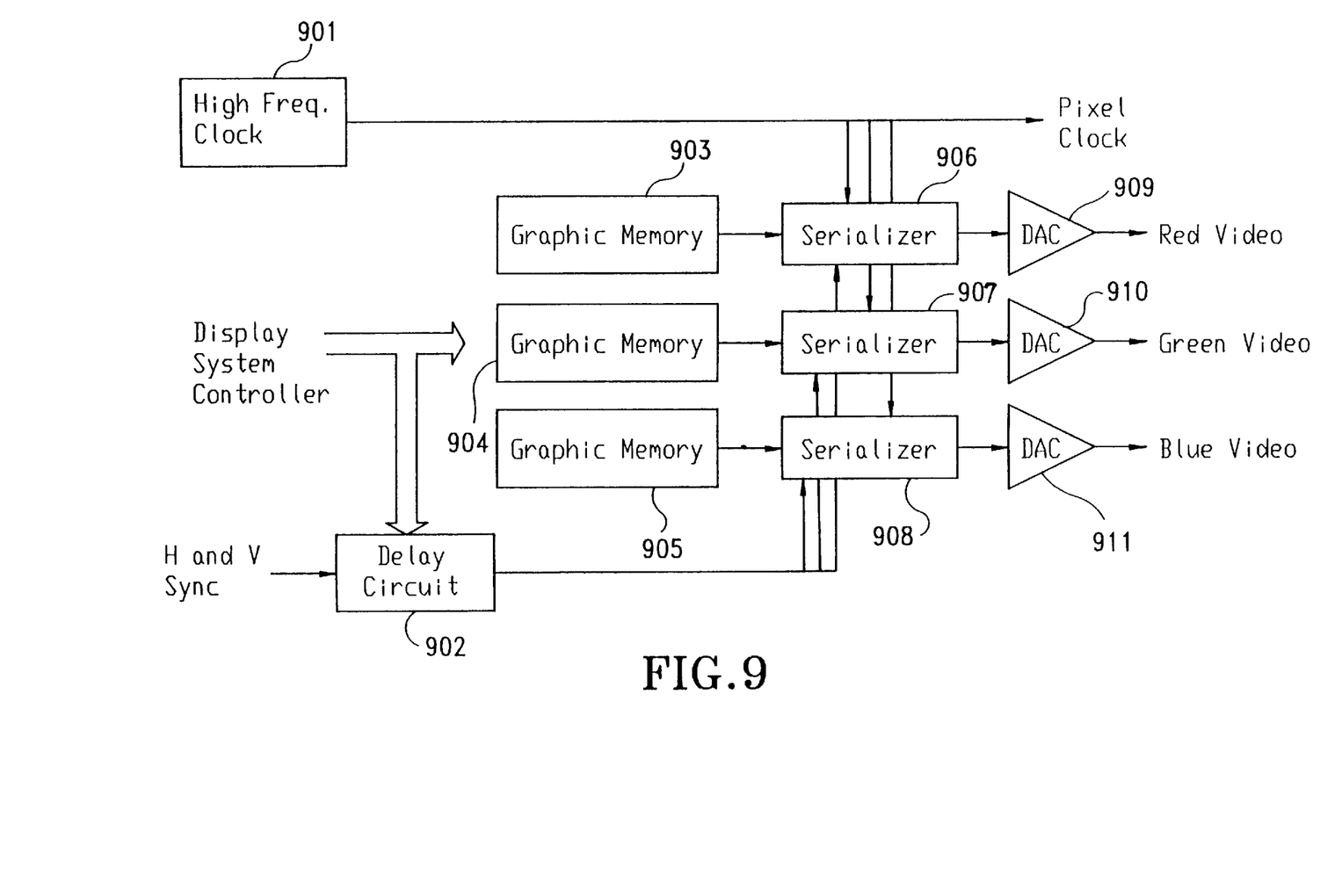
FIG. 9 illustrates a block diagram of an on screen display according the invention.

FIG. 9 describes block diagram representing an OSD (On Screen Display) function block of the preferred embodiment. Basic elements of the OSD function block are delay circuit 902, graphic memory 903, 904, and 905, serializer 906, 907, and 908, and DACs (Digital-to-Analog Converters) 909, 910, and 911. The display system controller 201 can fill up graphics memory 903, 904, and 905 (Red, Green, and Blue video follow the three channels, respectively) with graphics or text information based on microprocessor firmware or user front panel input. Content of the graphics memory 903, 904, and 905 then can be serialized by using serializer 906, 907, and 908 and the high frequency clock 901 that synchronized with the $S_{CLK}$. Function of the serializer 906, 907, and 908 is to convert parallel graphics information in graphics memory 903, 904, and 905 to pixel data, and feed them through DACs 909, 910, and 911 and becomes analog video data (Red, Green, and Blue video data).

For low cost applications, DACs 909, 910, and 911 are not used, and the serialized data are sent out directly, resulting in limited color choices. Each color only has on or off state, so a total of eight colors (including black) is available. Serializer 906, 907, and 908 also take in the HSync and VSync in order to know when to start. Delay circuit 902 inserted after the HSync and VSync have the effect of repositioning the OSD video data. By changing the high pixel clock, it has the effect of changing the OSD video display size. High frequency pixel can be easily modified by changing the counter divider 511 division number. Because the pixel clock is synchronized with the display timing, this video information can be merged or superimposed with standard video input of a CRT based display system, thus achieving the effect of a stable on screen display.

In addition, all applications mentioned above can be used in color monitors, monochrome monitors, computer color monitors, computer monochrome terminals, televisions, hi-definition televisions, and moniputers. Multimedia display system and projection versions of above display systems are also included.

In conclusion, the novel circuits achieved the purpose of combining the horizontal processor, the vertical processor, and the display system controller in a single chip, using a primary a digital circuit with PLL analog function block. Display synchronization, position and size, as well as linearity and pincushion correction can be achieved. Video blanking circuit can also be incorporated with ease. Via the VCO range tuning circuit, PLL effective ranges can be significantly extended to cover a wide variety of timing requirements. Optional on screen display circuit can be incorporated as a logical extension of the novel circuit.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A single chip display processing system for a cathode ray tube-based display system, said single chip display processing system communicating with a front panel, a video processor, a power video circuit, a power supply, a power horizontal deflection circuit and a power vertical deflection circuit, comprising:

display system controlling means for generating a plurality of control signals responsive to signals input from said front panel, said power horizontal deflection circuit and said power vertical deflection circuit, for controlling image contrast, color, brightness, and size;

horizontal processing means comprising:
digital delaying line means responsive to a horizontal synchronization signal and generating a delayed horizontal synchronization signal;
voltage controlled oscillator tuning means responsive to a control signal from said display system controlling means for generating a tuning signal;
first horizontal phase control means coupled to said power horizontal deflection circuit for outputting a horizontal deflection driving signal to said power horizontal deflection circuit in response to a feed back signal from said power horizontal deflection circuit, said delayed horizontal synchronization signal, and said tuning signal;
second horizontal phase control means for generating a high frequency clock in response to said horizontal deflection driving signal, and said tuning signal; and vertical processing means comprising:
first counter dividing means for dividing down said high frequency clock and generating a synchronization clock;
delayed counter dividing means responsive to said synchronization clock for inputting a vertical synchronization signal and generating a delayed vertical synchronization signal;
second counter dividing means responsive to said delayed vertical synchronization signal for generating a pulse control signal;
pulse width modulation generating means responsive to said pulse control signal for generating a pulse width modulation frequency;
low pass filtering means for inputting and filtering said pulse width modulation frequency and generating an analog signal;
integrating means responsive to said delayed vertical synchronization signal for generating a vertical ramp signal; and
third counter dividing means responsive to said delayed vertical synchronization signal and said synchronization clock for generating a video blanking signal having a width controlled by said display system controlling means.

2. The display processing system according to claim 1, wherein said first horizontal phase control means comprises:
first phase comparing means for inputting and comparing said delayed horizontal synchronization signal and said feed back signal from said power horizontal deflection circuit and generating a difference signal;
low pass filtering means for inputting said difference signal and generating a filtered difference signal;

first voltage controlled oscillating means for inputting said filtered difference signal and generating a first oscillating signal in response to said tuning signal from said voltage controlled oscillator; and
driving means for amplifying and phase locking said first oscillating signal.

3. The display processing system according to claim 1, wherein said second horizontal phase control means comprises:
fourth counter dividing means responsive to a control signal from said display system controlling means for dividing down said high frequency clock and generating a divided-down high frequency clock;
second phase comparing means for inputting and comparing said horizontal deflection driving signal and said high frequency clock for generating a second phase comparing signal;
low pass filtering means for inputting said second phase comparing signal and generating a filtered second phase comparing signal;
second voltage controlled oscillating means responsive to said filtered second phase comparing signal and said tuning signal for generating a second oscillating signal; and
driving means responsive to said second oscillating signal for generating said high frequency clock.

4. The display processing system according to claim 3, wherein said divided-down high frequency clock of said fourth counter dividing means is synchronized with said horizontal synchronization signal, and said second oscillating signal of said second voltage controlled oscillator is synchronized with said power horizontal deflection circuit.

5. The display processing system according to claim 1, wherein said voltage controlled oscillating tuning means comprises:
a tuning RC network comprising a plurality of MOS transistors and capacitors for receiving a control signal from said display system controller; and a phase lock look oscillator circuit for receiving a plurality of output signals from said tuning RC network and generating a waveform based on a tuning frequency signal from said display system controlling means.

6. The display processing system according to claim 1, further comprising on screen display means for generating video data, said on screen display means comprising:
graphic storing means responsive to a control signal from said display system controlling means for storing graphic data;
delaying means responsive to said control signal, said horizontal synchronization signal, and said vertical synchronization signal for generating a reposition signal; and
serializing means for inputting said graphic data and generating a digital pixel signal in response to said high frequency clock and said reposition signal.

7. The display processing system according to claim 6, further comprising:
digital to analog converting means coupled to said serializing means for converting said digital pixel signal into an analog pixel signal.

8. The display processing system according to claim 1, wherein said horizontal processing means further comprises:
fifth counter dividing means for generating a horizontal video blanking signal in response to said high frequency clock from said second horizontal phase control means and said horizontal deflection driving signal.

9. The display processing system according to claim 1, wherein said vertical synchronization signal resets said integrating means to terminate said vertical ramp signal and ensure said vertical ramp signal always starts at the same voltage after vertical retrace.

10. The display processing system according to claim 6, wherein said display system controlling means, said horizontal processing means, said vertical processing means, and said on screen display processing means are implemented on a single chip.

11. The display processing system according to claim 1, wherein said horizontal processing means further comprising:
a synchronized gating clock for segregating horizontal display of said cathode ray tube based display system into equal time periods generated by using said high frequency clock, and for cathode ray tube attributes correction in a horizontal direction.

12. The display processing system according to claim 11, wherein said cathode ray tube attributes comprises:
geometry attributes, colorimetry attributes, convergence attributes, and purity attributes.

13. A single chip display processing system for a cathode ray tube based display system, said single chip display processing system communicating with a front panel, a video processor, a power video circuit, a power supply, a power horizontal deflection circuit and a power vertical deflection circuit, comprising:
display system controlling means for generating a plurality of control signals responsive to signals input from said front panel, said power horizontal deflection circuit and said power vertical deflection circuit, for controlling image contrast, color, brightness, and size;
horizontal processing means comprising
digital delaying line means responsive to a horizontal synchronization signal and generating a delayed horizontal synchronization signal;
voltage controlled oscillator tuning means responsive to a control signal from said display system controlling means for generating a tuning signal;
first horizontal phase control means coupled to said power horizontal deflection circuit for outputting a horizontal deflection driving signal to said power horizontal deflection circuit in response to a feed back signal from said power horizontal deflection circuit, said delayed horizontal synchronization signal, and said tuning signal;
second horizontal phase control means for generating a high frequency clock in response to said horizontal deflection driving signal, and said tuning signal;
vertical processing means comprising
first counter dividing means for dividing down said high frequency clock and generating a synchronization clock;
delayed counter dividing means responsive to said synchronization clock for inputting a vertical synchronization signal and generating a delayed vertical synchronization signal;
second counter dividing means responsive to said delayed vertical synchronization signal for generating a pulse control signal;
pulse width modulation generating means responsive to said pulse control signal for generating a pulse width modulation frequency;
low pass filtering means for inputting and filtering said pulse width modulation frequency and generating an analog signal;
integrating means responsive to said delayed vertical synchronization signal for generating a vertical ramp signal;
third counter dividing means responsive to said delayed vertical synchronization signal and said synchronization clock for generating a video blanking signal having a width controlled by said display system controlling means; and
on screen display processing means responsive to a control signal from said display system controlling means for generating video data.

14. The display processing system according to claim 13, wherein said first horizontal phase control means comprises:
first phase comparing means for inputting and comparing said delayed horizontal synchronization signal and said feed back signal from said power horizontal deflection circuit and generating a difference signal;
low pass filtering means for inputting said difference signal and generating a filtered difference signal;
first voltage controlled oscillating means for inputting said filtered difference signal and generating a first oscillating signal in response to said tuning signal from said voltage controlled oscillator; and
driving means for amplifying and phase locking said first oscillating signal.

15. The display processing system according to claim 13, wherein said second horizontal phase control means comprises:
fourth counter dividing means responsive to a control signal from said display system controlling means for dividing down said high frequency clock and generating a divided-down high frequency clock;
second phase comparing means for inputting and comparing said horizontal deflection driving signal and said high frequency clock for generating a second phase comparing signal;
low pass filtering means for inputting said second phase comparing signal and generating a filtered second phase comparing signal;
second voltage controlled oscillating means responsive to said filtered second phase comparing signal and said tuning signal for generating a second oscillating signal; and
driving means responsive to said second oscillating signal for generating said high frequency clock.

16. The display processing system according to claim 15, wherein said divided-down high frequency clock of said fourth counter dividing means is synchronized with said horizontal synchronization signal, and said second oscillating signal of said second voltage controlled oscillator is synchronized with said power horizontal deflection circuit.

17. The display processing system according to claim 13, wherein said voltage controlled oscillator tuning means comprises:
a tuning RC network comprising a plurality of MOS transistors and capacitors for receiving a control signal from said display system controller; and a phase lock loop oscillator circuit for receiving a plurality of output signals from said tuning RC network and generating a waveform based on a tuning frequency signal from said display system controlling means.

18. The display processing system according to claim 13, wherein said on screen display means comprises:
graphic storing means responsive to a control signal from said display system controlling means for storing graphic data;

delaying means responsive to said control signal, said horizontal synchronization signal, and said vertical synchronization signals for generating a reposition signal; and serializing means for inputting said graphic data and generating a digital pixel signal in response to said high frequency clock and said reposition signal.

19. The display processing system according to claim 18, further comprising:

digital to analog converting means coupled to said serializing means for converting said digital pixel signal into an analog pixel signal.

20. The display processing system according to claim 13, wherein said horizontal processing means further comprises:

fifth counter dividing means for generating a horizontal video blanking signal in response to said high frequency clock from said second horizontal phase control means and said horizontal deflection driving signal.

21. The display processing system according to claims 13, wherein said vertical synchronization signal resets said integrating means to terminate said vertical ramp signal and ensure said vertical ramp signal always starts at the same voltage after vertical retrace.

22. The display processing system according to claim 13, wherein said display system controlling means, said horizontal processing means, said vertical processing means, and said on screen display processing means are implemented on a single chip.

23. The display processing system according to claim 13, wherein said horizontal processing means further comprises:

a synchronized gating clock for segregating horizontal display of said cathode ray tube based display system into equal time period generated by using said high frequency clock, and for cathode ray tube attributes correction in a horizontal direction.

24. The display processing system according to claim 22, wherein said cathode ray tube attributes comprises:

geometry attributes, colometry attributes, convergence attributes, and purity attributes.

* * * * *